(12) United States Patent
Crudele et al.

(10) Patent No.: US 12,061,661 B2
(45) Date of Patent: Aug. 13, 2024

(54) INSIGHT ENGINE

(71) Applicant: Steady Platform LLC, Atlanta, GA (US)

(72) Inventors: Marcel Crudele, Atlanta, GA (US); John Michael Robertson, Atlanta, GA (US); Kien Lam, Atlanta, GA (US); Jeff Chelko, Atlanta, GA (US); Nikhil Gorantla, Atlanta, GA (US); Thaddeus Gholston, Atlanta, GA (US); Andrew Toloff, Atlanta, GA (US); Winn Martin, Atlanta, GA (US)

(73) Assignee: STEADY PLATFORM, INC., Atlanta, GA (US)

( * ) Notice: Subject to any disclaimer, the term of this patent is extended or adjusted under 35 U.S.C. 154(b) by 0 days.

(21) Appl. No.: 17/148,627

(22) Filed: Jan. 14, 2021

(65) Prior Publication Data

US 2021/0224339 A1    Jul. 22, 2021

Related U.S. Application Data

(60) Provisional application No. 62/963,670, filed on Jan. 21, 2020.

(51) Int. Cl.
| | |
|---|---|
| G06F 16/00 | (2019.01) |
| G06F 16/22 | (2019.01) |
| G06F 16/242 | (2019.01) |
| G06F 16/955 | (2019.01) |
| G06F 40/149 | (2020.01) |
| H04L 51/046 | (2022.01) |

(52) U.S. Cl.
CPC ........ *G06F 16/955* (2019.01); *G06F 16/2282* (2019.01); *G06F 16/244* (2019.01); *G06F 40/149* (2020.01); *H04L 51/046* (2013.01)

(58) Field of Classification Search
CPC .. G06F 16/955; G06F 16/2282; G06F 16/244; G06F 40/149; G06F 40/186; G06F 16/951; H04L 51/046
See application file for complete search history.

(56) References Cited

U.S. PATENT DOCUMENTS

| | | | |
|---|---|---|---|
| 10,460,391 B2 * | 10/2019 | Caldwell | G06Q 40/06 |
| 10,510,113 B2 | 12/2019 | Caldwell | |
| 10,984,468 B1 | 4/2021 | Hockey et al. | |

(Continued)

*Primary Examiner* — Alex Gofman
*Assistant Examiner* — Suman Rajaputra
(74) *Attorney, Agent, or Firm* — Buckley, Maschoff & Talwalkar LLC

(57) ABSTRACT

Provided are systems and methods for providing insights to users of a mobile application based on triggers that may be detected from within the data or externally. In one example, a method may include receiving, via a message transmitted to a uniform resource locator (URL) of a host platform, information about a user of a software application, reading a plurality of records associated with the user from the received information, the plurality of records comprising data and a plurality of timestamps, respectively, generating derived data based on the data included in the plurality of records, converting the plurality of timestamps into a single timing identifier that represents all of the plurality of timestamps, and transmitting, to a computing system, a notification comprising the derived data and the new timing identifier.

20 Claims, 10 Drawing Sheets

(56) References Cited

U.S. PATENT DOCUMENTS

| | | | |
|---|---|---|---|
| 2015/0339600 A1* | 11/2015 | Dodson | G06F 17/18 |
| | | | 703/2 |
| 2016/0180466 A1* | 6/2016 | Caldwell | G06Q 40/06 |
| | | | 705/17 |
| 2017/0132300 A1* | 5/2017 | Sekar | G06F 16/254 |
| 2018/0218448 A1 | 8/2018 | Thomas et al. | |
| 2018/0373781 A1* | 12/2018 | Palrecha | G06F 9/547 |
| 2019/0066203 A1 | 2/2019 | Smith et al. | |
| 2019/0163666 A1* | 5/2019 | Cakmak | G06N 5/02 |
| 2020/0137080 A1 | 4/2020 | Bloomquist | |
| 2020/0201727 A1* | 6/2020 | Nie | G06N 20/00 |
| 2020/0250172 A1* | 8/2020 | Busjaeger | G06F 16/24552 |
| 2021/0233162 A1* | 7/2021 | Hockey | G06F 16/951 |
| 2021/0248156 A1* | 8/2021 | Egami | G06F 3/0481 |
| 2021/0326980 A1 | 10/2021 | Thomas et al. | |

* cited by examiner

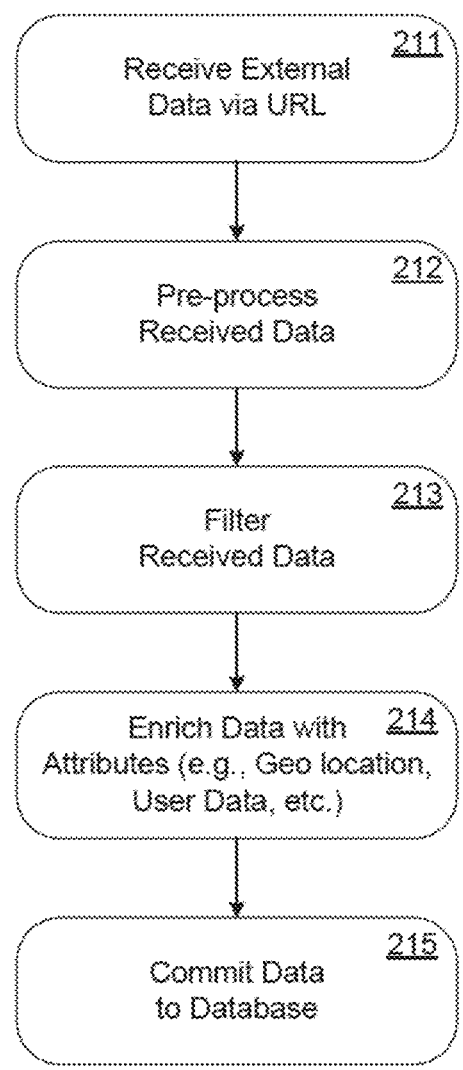

| 302 — Topic Mapping | 304 |
|---|---|
| Topic = Ride Sharing | Tables: X45, X12, X49, Y22, Y38 . . . |
| Topic = Delivery | Tables: X45, X12, X49, Y22, Y38 . . . |
| Topic = Labor | Tables: X45, X12, X49, Y22, Y38 . . . |
| Topic = Home Care | Tables: X45, X12, X49, Y22, Y38 . . . |

* * *
* * *
* * *

| | |
|---|---|
| Topic = Freelance | Tables: X45, X12, X49, Y22, Y38 . . . |

FIG. 3B

Baseline Data 300B

| Table ID | User ID | Length | Data Value | TimeStamp |
|---|---|---|---|---|
| X45 | Joe Smith | 8 hr | $87.40 | 2020-11-03 : 09:33:04 |
| X12 | Mark Davis | 8 hr | $99.67 | 2020-11-17 : 19:23:59 |
| X13 | Ella Theel | 8 hr | $112.20 | 2020-11-24 : 12:53:09 |
| X32 | Kate Lee | 8 hr | $74.78 | 2020-11-24 : 14:46:44 |

302 — 304 — 306 — 308 — 310 — 301

Derived Data

| Table ID | Record Count | Length | Derived Data | Timing Identifier |
|---|---|---|---|---|
| Y09 | 4 | 8 hr | $93.51 | Tuesday |

312 — 314 — 316 — 318 — 320 — 311

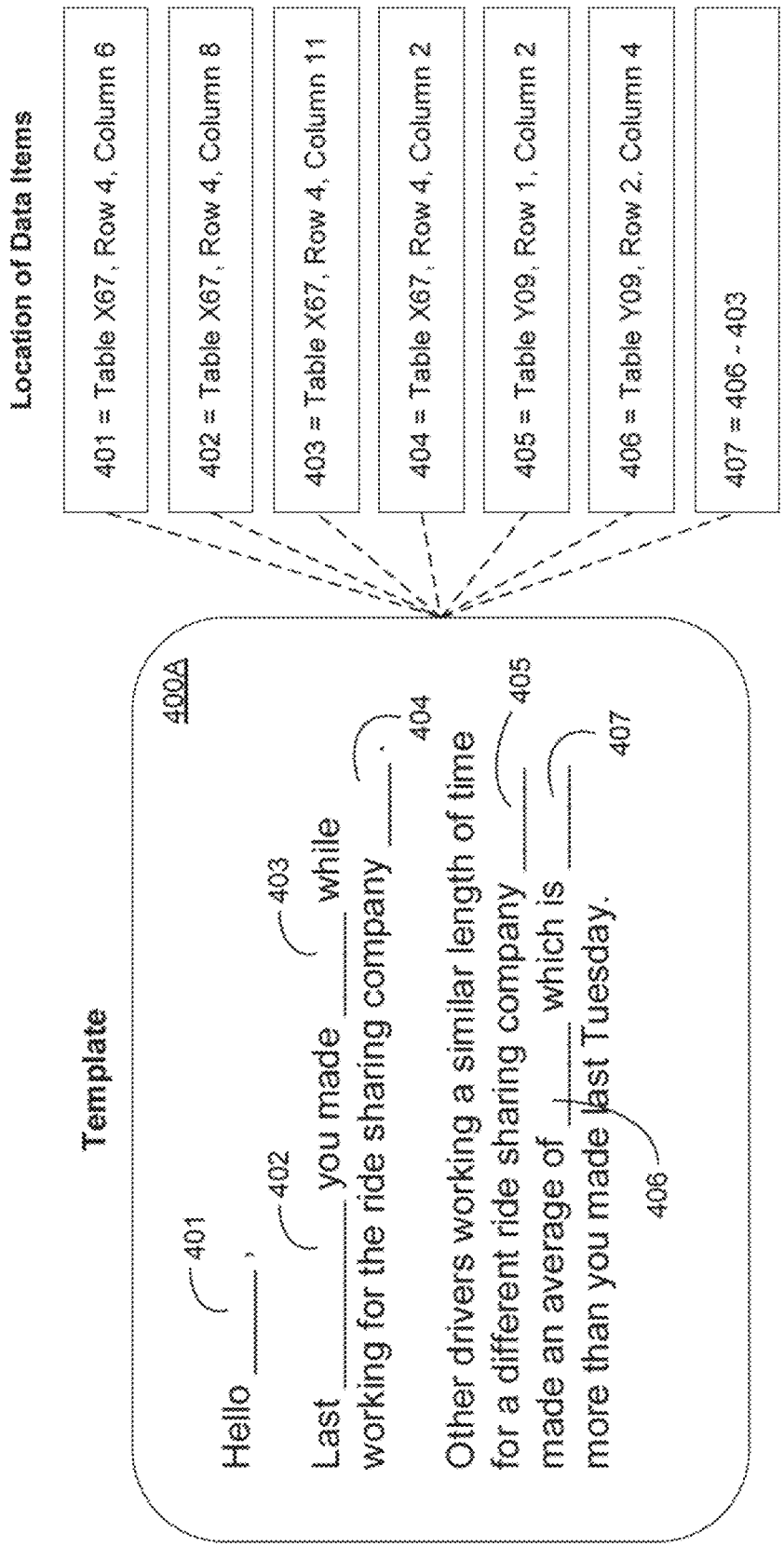

FIG. 4B

Template (Filled-in)

400B

Hello Mike,

Last Tuesday, you made $45.25 while working for the ride sharing company Corp A.

Other drivers working a similar length of time for a different ride sharing company Corp B made an average of $93.51 which is $48.26 more than you made last Tuesday.

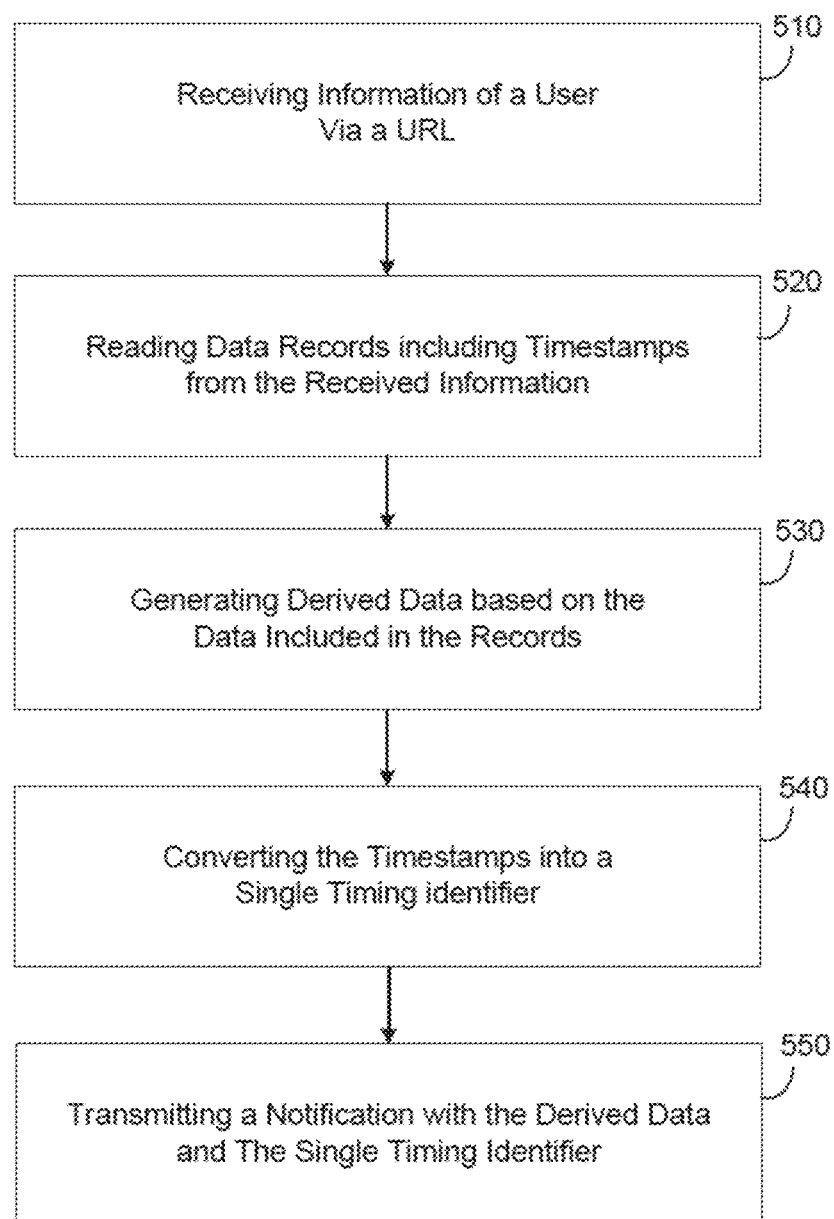

INSIGHT ENGINE

CROSS-REFERENCE TO RELATED APPLICATIONS

This application claims the benefit under 35 USC § 119(e) of U.S. Provisional Application No. 62/963,670, filed on Jan. 21, 2020, in the United States Patent and Trademark Office, the entire disclosure of which is hereby incorporated by reference for all purposes.

BACKGROUND

People often make choices based on limited information. For example, a person may choose a restaurant, a physician, a school, jobs, financial products or the like, based on information that is available at a particular time, without having all the knowledge available to all or simply by not having the time, tools, or skills to evaluate the information they do have in their possession. Making sense of large amounts of personal data and lack of access to other data relevant to a person's interest is an enormous challenge. Accordingly, what is needed is a way to provide insights to help people make better decisions.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2B is a diagram illustrating a process of ingesting data in accordance with an example embodiment.

FIG. 3A is a diagram illustrating a topic mapping used by a data store in accordance with an example embodiment.

FIG. 3B is a diagram illustrating a process of converting baseline data into derived data in accordance with an example embodiment.

FIG. 4A is a diagram illustrating a template that may be used for notifications in accordance with an example embodiment.

FIG. 4B is a diagram illustrating a filled-in template in accordance with an example embodiment.

FIG. 5 is a diagram illustrating a method of sending notifications based on derived data in accordance with an example embodiment.

Figure 1:
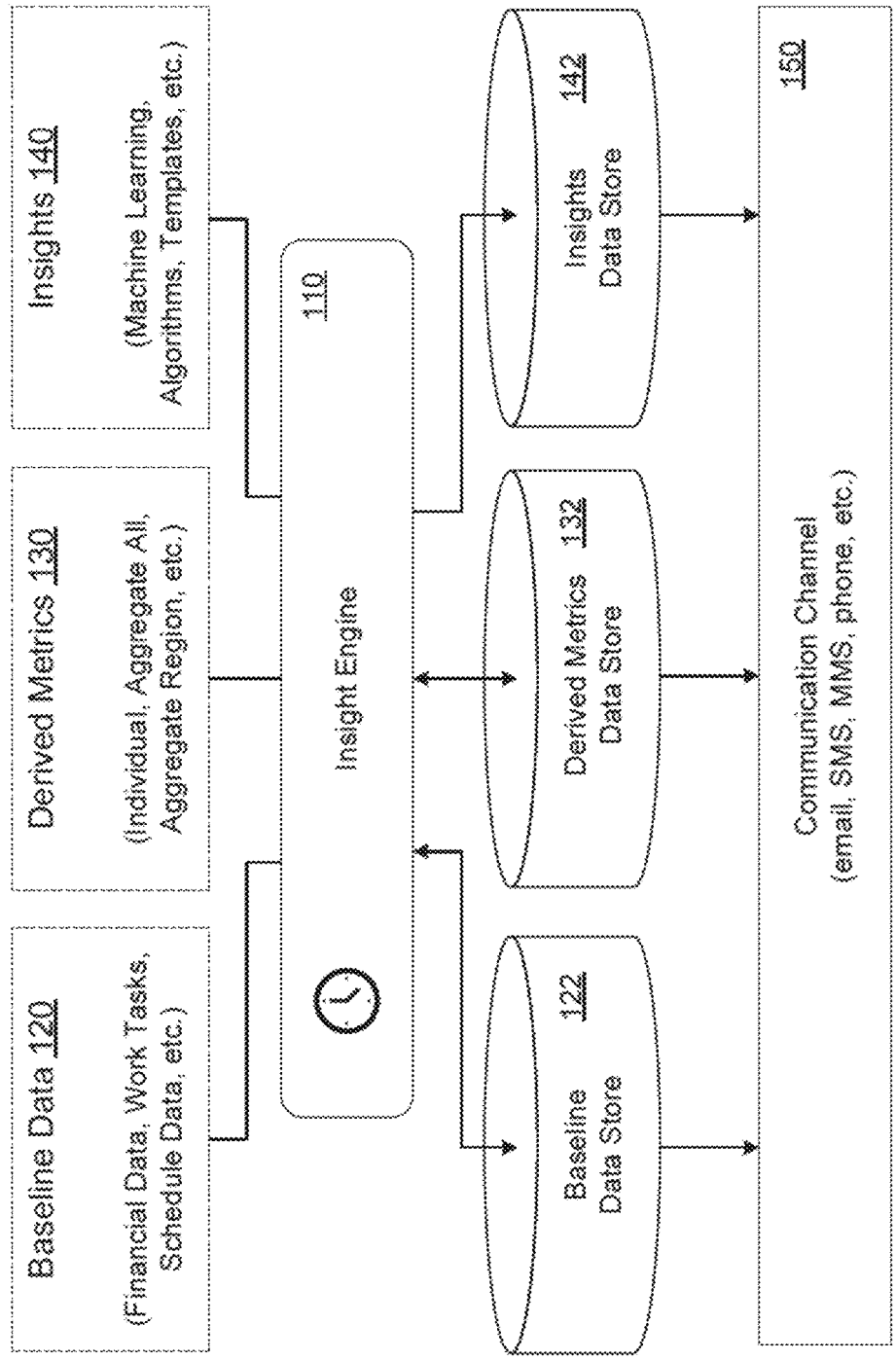
FIG. 1 is a diagram illustrating a data architecture of an insight engine in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

The example embodiments are directed to an insight engine that may be used to provide helpful insights to users within a community. The community may be integrated into a computing environment such as a website, mobile application, a message board, and the like. As one example, the insight engine may determine and provide insights to users of an employment-based online resource. For example, the insight engine may suggest different job opportunities, financial insights, and the like. The insight may be created through machine learning based on employment information of the user (e.g., job performance, etc.) employment information of other users, employment positions that are available, and the like. The insight may give the users a better understanding of what is possible in an automated fashion such that a user does not need to go "searching" different online resources for possibilities.

For example, an insight can identify an amount of money that a user earned last week performing a first task through a first vendor, and suggest a second task through a second vendor that could generate even more earnings for the user. Other insights are also possible such as comparisons of different geographical areas, job opportunities, and the like. In some cases, insights can extend beyond an individual and may include insights gathered through aggregation of data from multiple entities. The insights can help a user find the best (most lucrative, most convenient, easiest, closest, etc.) job opportunities to apply to. As another example, insights may provide a user with specific existing sources of income to maximize results. These setting may be customized by the individual users of the insight engine. In some cases, the system can connect users to the job opportunities via the company websites, etc. As another example, an insight may include a recommendation about financial services or products based on what is known or derived about an individual and/or the community as a whole.

FIG. 1 illustrates an example of an insight engine 110 using baseline data 120 to derive metrics 130. The insight engine 110 may also derive insights 140 based on one or more of the baseline data 120 and/or the derived metrics 130. As further described below, triggers may be detected by the insight engine 110 which cause the insight engine 110 to derive metrics 130 from the baseline data 120. In addition, triggers may be detected by the insight engine 110 to derive the insights 140 from the derived metrics 130 and/or the baseline data 120. Triggers can be event-driven (e.g., based on a change in a data value, data values of other users, etc.). As another example, triggers can be time-driven (e.g., daily, weekly, monthly, etc.) The definition of what triggers the generation of a derived metric or insight is part of the insight engine 110 as is the logic regarding the evaluation of data, related calculations, and eventual output of a derived metrics 130 and the insights 140.

The insight engine 110 may retrieve the baseline data 120 from a data store 122, and generate the derived metrics 130 and the insights 140. In this example, the insight engine 110 may store the derived metrics 130 in a data store 132 and the insights 140 in a data store 142. Meanwhile, a communication channel 150 which may be controlled or otherwise configured by a software application, etc., may communicate with the data stores 122, 132, and 142, and send notifications/insights to a user device (not shown). Here, the communication channel 150 may be email, SMS, MMS, phone call, or the like. As another example, the communication channel 150 may be in-app communication in which insight is pulled from accumulated data and displayed as a list of insight cards within a client-side mobile application. The insights 140 may include a textual description describing information that is relevant/helpful to the user. The insights 140 may provide the user with machine learning data, suggestions, recommendations, and the like, with respect to the tasks/jobs they are currently performing. As another example, the insights 140 may be based on an evaluation of aggregated data and/or metrics from other entities/users performing other tasks/jobs.

Although not shown in FIG. 1, one or more external sources may access the data stores 122 and 132 to generate insights based on various criteria. For example, an external/independent software program may periodically gather/collect user information over a predetermined period of time, generate insight from the collected data, and forward the insight to the users. Thus, the external software program may leverage the data within the data stores 122 and 132 but replace the need for the insight engine 110 to generate the insight.

As an example, an insight may be created from the baseline data 120 such as a new transaction event where a bank fee has been added to a user's account. Here, the insight may include a notification that the bank fee event occurred, as well as an insight derived from the new transaction event such as "this brings your total for the month up to $70" which is based on both baseline data plus metrics.

Although FIG. 1 shows the baseline data 120, the derived metrics 130, and the insights 140 being stored in separate data stores, the embodiments are not limited thereto. As another example, the different data types may be stored together in a central data store, a blockchain, or the like.

Different triggers can be initiated by the insight engine which cause the metrics to be derived and the insights to be sent. For example, a baseline data change trigger can occur when new baseline data is received. Here, the insight engine can generate one or more derived metrics, generate an insight based on any baseline data that has changed when the new baseline data is stored, generate an insight based on a combination of baseline data and one or more derived metrics.

Another example of a trigger is a derived metrics change trigger. In this example, the insight engine can generate one or more derived metrics, generate an insight based on a derived metric that changed, generate an insight based on a combination of one or more derived metrics, and the like.

Another example of a trigger is a time-based trigger. In this example, the insight engine can derive new metrics and generate insight based on timing occurrences identified from a system clock, etc. For example, in response to a time-based trigger, the insight engine can create one or more derived metrics from baseline data, create one or more derived metrics from derived metrics, create one or more derived metrics from combination of baseline data and derived metrics, create one or more insights from baseline data, create one or more insights from derived metrics, create one or more insights from combination of baseline data and derived metrics, and the like.

Baseline data may be converted into two tiers of abstraction, referred to as derived metrics and insights, through the use of triggers. This approach includes execution of predefined triggers to analyze baseline data and store the results as derived metrics as well as a second tier of triggers that will analyze both derived metrics and baseline data in order to create Insights to be shared with relevant audiences.

As described herein, baseline data is a collection of information related to an entity, such as financial transaction or work information for the users of an app. Derived metrics triggers are rules that describe how and when baseline data should be evaluated to calculate and store derived metrics as well as the engine that executes those triggers. Derived metrics triggers might also act on other derived metrics and the results stored. Derived metrics are the stored results of derived metrics triggers related to individual entities or to entity cohorts. With this approach, the derived metrics repository continually updates as derived metrics triggers execute and the repository can be used by other data consumers for purposes such as up-to-date report generation or inputs to machine-learning models. This repository can also be used as part of the foundation to create insights.

In the example embodiments, insight triggers are similar to derived metrics triggers, but monitor both baseline data and derived metrics. The insight trigger rules and engine that executes those rules produce insights. Insights are the result of insight triggers and are generally thought of as human-friendly content that communicates valuable information to relevant individuals and audiences based on the more complex data that generates that content, although insights could certainly take on additional forms.

In the examples herein, a "trigger" is used as a more generalized concept representing an action to be taken based on something that preceded it and should not be intended as a specific technical implementation such as a database or data store trigger on a table update operation, insert operation, delete operation, or the like.

As a non-limiting example, on the third business day of a new month (a time-driven trigger), several derived metrics triggers execute and evaluate, create, and update derived metrics. For example, a derived metric may include total income for the prior month for all users (derived metric trigger acting on baseline data to sum and store all income transactions for the previous month per user).

Another derived metric may include maximum monthly income which results in the execution of an event-driven derived metrics trigger that compares that income to the maximum monthly income for each user. The derived metric may be stored for each user. If the new monthly income is greater, the maximum monthly income derived metric is updated with that value (derived metric trigger acting on derived metric and comparing it to another derived metric to determine if an update should occur).

Another derived metric may be income by income source. Similar to the above, subtotals of income from all income sources (ride sharing, delivery, freelance, etc.) are also calculated and stored for the previous month and compared to maximum monthly income derived metrics for each income source to determine if an update is needed.

Another example derived metric is average income by income source for all users grouped by MSA (Metropolitan Statistical Area). Different than a derived metric for an individual entity/user, this represents a derived metric for an entity cohort which includes a collection of users.

Another example derived metric is average income by income source for all users grouped by primary source of income (retail, manufacturing, construction, service, etc.) The metric represents another analysis by entity cohort (i.e. average income from company A users classified as "Retail Workers").

An example of insight is provided below. For example, a user that has achieved a new maximum monthly income from rideshare company U is sent an insight through push notification or SMS—"You made $425 driving for company U last month—a new record! That's $123 more than the average driver in Atlanta and $75 more than other retail workers that also drive for company U." This represents an event-driven insights trigger based on the update of the new maximum income by source derived metric. Here, another event-driven insight trigger fires based on the creation of the new monthly derived metrics, creating an insight available within the app announcing the top income source for each MSA for users that don't have any history of income from that income source—"The average income from company P for people in Chicago is $784! Click to apply now." On the 4th business day, a time-driven insights trigger sends an email to all users providing them with an overview of their income from the previous month as well as information from relevant entity cohorts. Above are only a few examples of how the various features of this model could be applied.

As described herein, baseline data is the lowest level of data described in this approach and is received into the core of the insights engine as the starting point of the data repository that is the basis for the abstracted derived metrics and insights. Examples of baseline data include individual financial transactions such as purchases, income events, fees, and transfers, with information that might include financial institution, account identification, date, amount, category, funding source, and recipient. Additional transaction details might also be included such as—where applicable—principle, interest, and interest rate/APR information: sales tax: line item or SKU information: geographic information: etc.

Other examples of baseline data include individual or combination of work tasks such as delivery, rideshare, dog walk, or other services. Data could include, but not be limited to, source of work, total amount charged to recipient requesting task, income by worker including tip and/or bonus information, time taken to perform task(s), distance travelled, start and end location or other geographic information, start and end time, associated expenses, etc. Another example of baseline data is other work information. By way of example, this could include information on part-time or full-time work such as pay period: hours worked: schedule of hours worked: total income with details related to withholding, benefits, etc.: details of the work performed: geographic information; expenses: etc. Other examples of baseline data include geographic information by itself could also be included as baseline data, with information ranging from time-stamped Lat/long at the most basic level to a variety of supplemental information depending on the data source.

To illustrate the breadth of possible baseline data, below are other examples from various industries.
    Individual or team performance information from sports or video games
    Maintenance records for individual pieces of equipment
    Transit trip information for buses, planes, etc.

Baseline Data Sources
    Baseline Data could originate from a variety of sources, including, but not limited to:
        Third party sources such as
            Financial Transaction information from companies
            Work data from companies
            GPS information from companies
        First party sources such as
            Financial transaction information available through an organization's own financial product offering(s)
            Work data from an organization's own product offering, internal work management tools, or employee information
            GPS tracking features within an organization's own product offering
        Manual entry of information either through human data entry of all information or facilitated by enabling technologies such as Optical Character Recognition (OCR). This data entry could be performed by individual users of an application, internal resources of an organization transcription of the information, or be created as third-party User Generated Content.
Derived Metrics
    Derived Metrics refers to a collection of metrics that are determined through the analysis of baseline data or other derived metrics, resulting in a repository of "enhanced" data that is available for consumption. There are 2 main advantages to this:
        Repetitive calculations can be avoided by having the result stored and updated either periodically (time-based update) or as new data affecting the result of the calculation is collected (event-driven update).
        Any update to a derived metric can serve to activate an event-driven derived metrics trigger or insights trigger. In effect, this can create a cascading, self-updating ecosystem that can autonomously and proactively communicate relevant information based on predefined rules.
    An example of a single derived metric is calculating the previous month's income for a person (derived metric) by summing all of their income events from financial transaction information (baseline data).
    The uniqueness of our approach is tied to 1) our structure for the repository of these metrics and 2) the addition of derived metrics triggers to maintain the integrity and accuracy of our derived metrics repository.
Organization and Derived Metrics Triggers
    Derived metrics are a collection of calculated metrics that automatically update based on predefined triggers, creating a repository that can be relied on by other data consumers—such as reports, machine learning models, or Insights.
    Derived metrics can be defined for an individual entity (i.e. income YTD for an individual person) or by entity cohort (e.g., income YTD for people in Atlanta).
    Derived metrics are updated by derived metrics triggers that are either time-driven (e.g., run the 3rd business day of each month at 4 AM EST) or event-driven, with the most likely events coming from changes in either baseline data or other derived metrics, although other triggers are possible.
    Derived metrics triggers are defined as rules and then managed and executed by a rules engine. The structure of these triggers is, "When this happens, perform this process and, if the specified conditions are met (if any), create or update derived metric(s) as defined by the trigger."
    Some examples of these trigger definition concepts are:
        Time-driven creation: On the 3rd business day of each month, create new derived metric for all users that is the sum of all income in the previous month.

Time-driven creation for entity cohort: On the 3rd business day of each month, create new derived metric for all MSA's that is the average income per person in each MSA for the previous month.

Time-driven update: At 4 AM Eastern time each day, update the YTD and MTD income for all users Event driven creation: On creation of average income for an MSA in the previous month, create a new derived metric for the standard deviation of income within that MSA. This is an example of a derived metric triggering the creation of a new derived metric (versus a derived metric based on baseline metrics only).

Conditional event-driven update: On receipt of new financial transaction, if transaction is of type bank fee, update YTD and MTD bank fee derived metrics.

Derived Metrics Engine

The derived metrics engine stores and is responsible for executing the derived metrics triggers. This includes a scheduler for time-driven triggers and a monitor to identify the changes that will activate event-driven triggers. By way of example, the monitor might be called on inserts or updates to baseline data to determine if any triggers are applicable. Another approach would have the engine evaluate incremental data periodically against the collection of defined triggers.

Entity Cohorts

A concept already mentioned that deserves further discussion is entity cohorts. In addition to derived metrics for individual entities, being able to generate derived metrics for predefined groups of entities is also very powerful. Definition of these cohorts is an additional part of the model proposed.

Entity cohort definition is based on properties available to the derived metrics engine for each entity. The stringency of this definition could be as focused or as broad as desired, with examples including:

All entities i.e. "All users"

All entities within an MSA, i.e. "Users in Seattle"=>all users with location=Seattle All entities within an MSA that have income from a category, i.e. "Miami retail workers"=>all users with location=Miami AND incomeRetailYTD>$0. This uses both an entity property (location) and a Derived Metric (incomeRetailYTD) to define the entity cohort.

At its most basic definition, an entity cohort is a collection of entities for which it has been determined would be of interest to track—as a group—derived metrics.

Storage and Propagation of Data

The method of storing derived metrics can vary, with examples including, but not limited to a flat file, a relational database, a "no SQL database", or in a CRM type platform where the metrics are associated with entities and entity cohorts. By way of example for the latter of these examples, a user's profile in a platform of an external data source could be updated with derived metrics such as "Average Monthly Income."

Similarly, the propagation of derived metrics could occur in multiple ways, including but not limited to:

A push of updated derived metrics to other data stores such as data warehouses, data lakes, CRMs or other 3rd party tools. This propagation could be scheduled or event-driven as data is updated.

A pull of updated information by any data stores with access to the derived data. This could be a scheduled refresh of data, be in response to an update of data via a notification such as a webhook, or through other means.

Open access to the derived metrics repository for data access, where the derived metrics act as the data source for other applications and processes.

A frequent method that can involve the first 2 of the above methods is commonly referred to as an "identity call."

Insights

Insights are intended as human-friendly interpretation of derived metrics and baseline data, with basic examples being, "You've paid $231 in bank fees so far this year. Sign up for a bank account with no bank fees." or "You made $62 yesterday and drove 42 miles delivering for delivery service B." These examples are insights that blend derived metrics and baseline data.

Insights Triggers

Insights triggers are similar to derived metrics triggers except that derived metrics triggers output is numeric information stored for additional reporting and calculations and Insight Triggers generate content intended for communication with a non-technical audience.

Content of Insights

The types of content within an Insight can be wide ranging, including, but not limited to, these examples:

In its most basic form, it could be text with no dynamic content such as "You reached a new goal."

It could include dynamic content straight from derived metrics or baseline metrics such as "You have a new bank fee of $35," or "You made $3,500 last month—congratulations."

It could include calculations such as "You made 35% more last month than your average income," there the 35% could be a calculation performed during Insight creation, but that metric itself not stored beyond the insight creation.

It could include the sharing of derived metrics not based on any baseline data from a recipient. This type of insight is referred to as a community insight and an example could be informing a person that has never driven for company A that "People in your area make an average of $312/mo driving for company A."

Beyond the formulation of text, insights could involve richer media content. For example, some insight triggers might generate Insights that have images, videos, music, hyperlinks, attachments, or other content that might be useful to company A. This could range from a graphic of a smiley face as part of a message for reaching a new milestone to a video or attached pdf that have information on paying down bills for a user that seems to have increasing debt.

Audience Definition

An audience definition for an insight may represent the total audience that results from an insight trigger. For example, an insight trigger defined to generate a message for all users in Atlanta that had a bank fee last month could be sent to everyone that qualifies from that definition.

That being said, audiences could be defined in other ways, such as a message affinity engine that filters Insight distribution based on each recipient's affinity for that message type. Building on the above example of recipients in Atlanta that have bank fees, an affinity engine may know that only a subset of those recipients respond well to messaging about bank fees and may further filter the audience to only those people.

Delivery of Insights

As diverse as the type of content that could be contained for an insight are the ways Insights could be delivered. Electronic delivery such as in-app, push, SMS, and email are certainly the most obvious, but insights could also be delivered as Instant Messages through 3rd party apps such as WhatsApp, Facebook Messenger, Slack, Telegram, Signal, Kik, etc.

Less traditional, Insights could also be delivered through automated phone calls, physical letters sent to a person's residence or work, or even packages. In a more far-reaching example, a User that doubled their income after using Steady for a year might receive a physical gift delivered to their home to congratulate them on their accomplishments. In the latter case, the Derived Metric update of the new accomplishment would fire an Insights Trigger that could send the relevant information to a 3rd party responsible for delivery of the package.

Figure 2A:
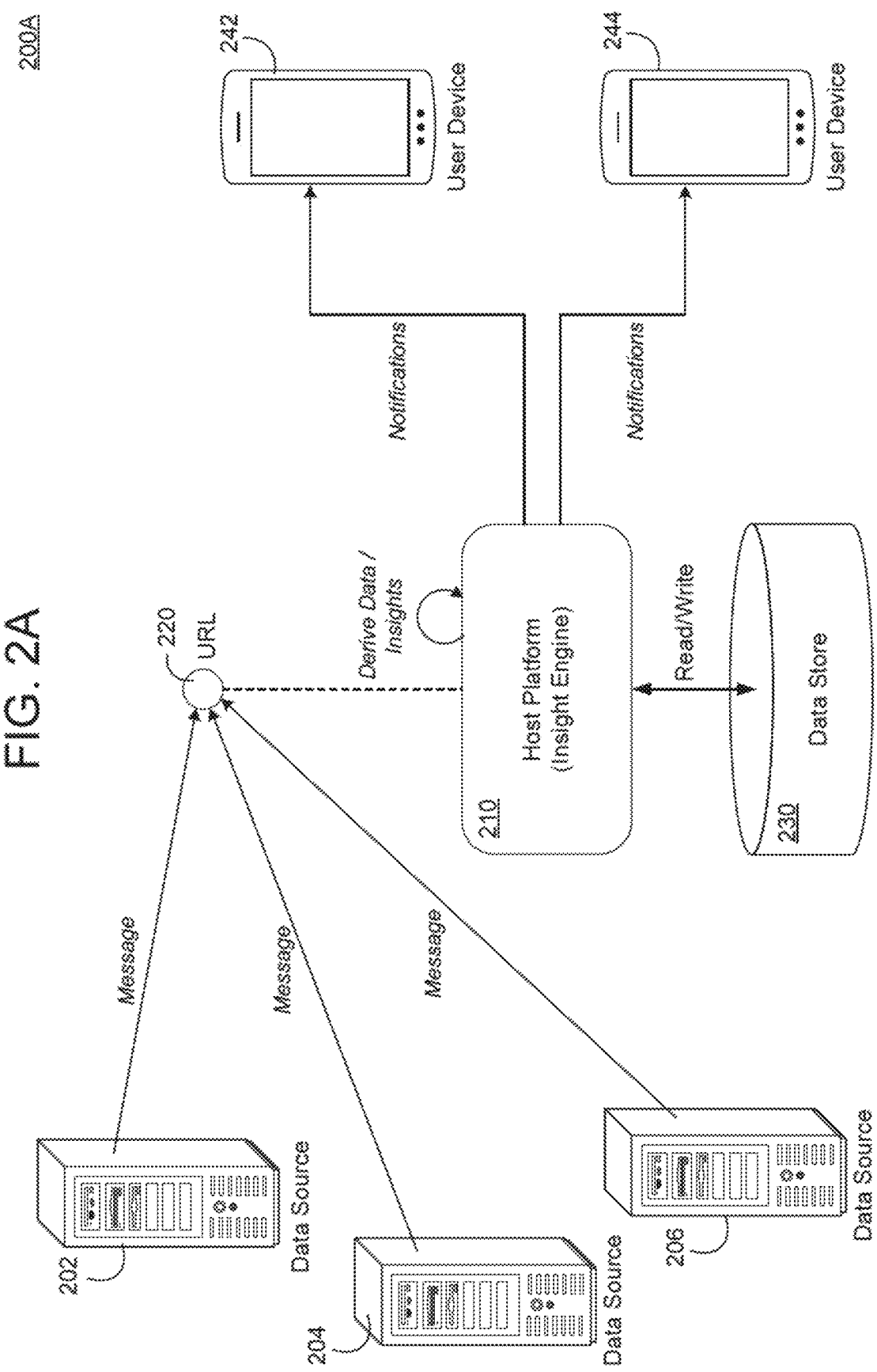
FIG. 2A is a diagram illustrating a process of data being ingested and notifications being generated in accordance with an example embodiment.

FIG. 2A illustrates a process 200A of data being ingested and notifications being generated by a host platform 210 in accordance with an example embodiment. Referring to FIG. 2A, the host platform may be implemented via a cloud platform, a web server, a database, a computing device, or the like. The host platform 210 may be a host of an application (e.g., a mobile application, a web application, etc.) which provides users with recommended job opportunities. It should be appreciated that this is just one example, and the host platform may host other types of applications.

In FIG. 2A, the host platform has a corresponding uniform resource locator (URL) 220 where webhooks from external data sources 202, 204, 206, etc. can be received thereby triggering data to be collected by the host platform. The external data sources 202, 204, 206, etc., may include banks, credit agencies, organizations, payroll companies, human resource departments, and the like. The data (also referred to herein as baseline data) may include financial data, employment data, user data, shift data, payment data, and the like. The data may be collected for all users of the system. The users may first "allow" for their data to be collected to protect the privacy of individuals who do not want their data collected.

The data from the external sources 202, 204, 206, etc., may be retrieved by the host platform 210 via application programming interfaces (APIs) of the external data sources 202, 204, 206, etc. In this example, the data may be consumed as transactions using C #which consumes the data via the APIs after getting triggered by the webhooks via the URL 220. These transactions (records) may be written to a predefined partition, table, topic, etc., within a data store 230. As one example, the data store 230 may have a plurality of topics corresponding to a plurality of employment types (e.g., ride sharing, delivery driver, freelance, manual labor, home rental, etc.).

In this example, the data store 230 may receive new data collected by the host platform 210 from the external sources 202, 204, 206, etc., categorize the data into one of the topics, and store the data records in a table/partition associated with the categorized topic. Here, the data records may be stored by the host platform via structured query language (SQL) commands which read and write data to tables/partitions within the data store 230 using predefined SQL commands. Identifiers of the tables where topic data is stored may be mapped to the topic within an index, a dictionary, a table, etc., within the data store 230.

The host platform 210 may also derive data and insights from the data collected from the external sources 202, 204, 206, etc., and stored in the data store 230, and transmit notifications to user devices (e.g., user devices 242, 244, etc.) including information about the derived data and the insights. The derived data may include table data stored in the data store 230 that has been modified via aggregation, etc. Furthermore, insights may include context associated with the derived data. The notifications may be transmitted to user devices 242, 244, etc., via email, short message service (SMS), phone calls, and the like. The notifications may be generated and transmitted in response to triggers as previously described herein. Triggers may be time-driven or event-driven.

For example, a time-driven trigger (e.g., the end of the month of October) may cause the host platform 210 to generate derived data that includes a total amount of income made by user A during a previous month (e.g., October) while performing the duties of a delivery driver. Here, the data store 230 may create the derived data by adding together all the income of user A that is stored in the data store 230 that has a timestamp from the month of October, and is identified as being associated with a delivery topic in the data store 230. As another example, the derived data may include an average pay of all users within a predetermined geolocation of the user who performed home care work in the month of October. In this example, the data store 230 may aggregate table data from a "home care" topic in the data store 230, and create the newly derived data which is stored in a new table.

Furthermore, the host platform 210 may create insight by combining the derived data with context. In this example, the host platform may identify that user A has previously worked for a home care company. In this example, the insight may provide the user with a comparison of the income that user A earned as a delivery driver for the month of October and what user A could have made (on average) as a home care worker, as shown in the example below:

"Great job. You made $478 in the month of October working for Company A as a delivery driver. Meanwhile, other users in the city of Atlanta made an average of $828 working as a home care specialist."

FIG. 2B illustrates a process 200B of ingesting data via the host platform in accordance with an example embodiment. Referring to FIG. 2B, in 211, the host platform receives data that is provided from external sources. Here, the data may be retrieved by the host platform based on webhooks that are transmitted to a URL of the host platform. The data may be retrieved via communications through APIs of the external data sources. The external data sources may include financial institutions, organizations which provide employee data, user data sources, and the like.

In 212, the host platform may pre-process the received data. For example, the host platform may clean the transactions by identifying a category of the data, for example, a type of job category associated with the data. The job category can correspond to jobs that are available in a gig economy, for example, ride sharing, delivery driver, freelance, home care, vacation rental, etc. Here, the data may be related to a particular job (e.g., working as a delivery driver for company Z). Here, the data may include financial information indicating how much income a user made working for company Z (merchant) for the last week, month, year, etc. Other data may include how many hours were worked, the time at which the user worked, and the like. In 213, the host platform may filter the data to remove any data that is irrelevant for the purposes of determining derived metrics and insight such as non-work related data, etc. The filtering may be based on a search criteria (e.g., only data from November, but no other months, etc.) Steps 212 and 213 may be performed in any order and not necessarily one after the other.

In 214, the host platform may enrich the data with additional information that can be obtained by the host platform such as geolocation information of the user, geolocation information of the merchant, etc. The information may be combined with the collected information thereby enhancing the originally collected information. The enrichment process may be performed via web crawling, etc.

In 215, the host platform may commit the received data to the data store. Here, the host platform may write the collected data to particular tables, partitions, documents, etc. that are associated with a topic. For example, each type of job category may have its own topic or topics. The host platform may commit information that is categorized according to a particular job category within a table that is assigned to a topic corresponding to that category. Therefore, the host platform can subsequently search this data for metrics and insights. Here, the data may be stored via SQL commands or the like.

Figure 2C:
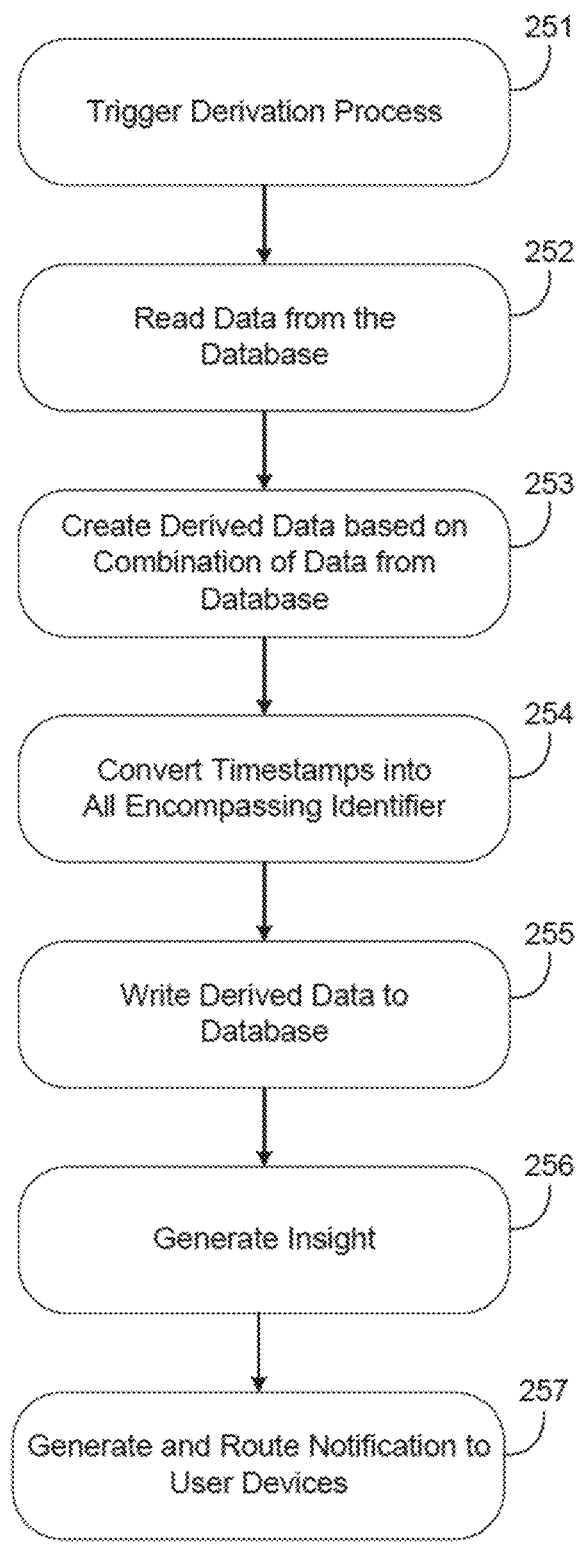
FIG. 2C is a diagram illustrating a process of deriving insight based on the ingested data in accordance with an example embodiment.

FIG. 2C illustrates a process 200C of deriving insight based on the ingested data in accordance with an example embodiment. Now that the data has been committed to the data store, such as via the example of process 200B in FIG. 2B, the data can be read, process, and modified to derive additional data (e.g., metrics, etc.) and provide insights to the users of the host platform. In 251, the host platform triggers a derivation process to produce metrics and insight. Example triggers include time (e.g., a system clock reaching a particular period of time such as the start of a new week, the start of a new month, a new quarter, etc.). Another example of a trigger is an event based trigger such as new data being collected, a request from the user, etc.

In 252, the host platform may read data from the data store. For example, the host platform may execute SQL commands to read data from tables/partitions of a particular topic. In this example, the trigger may be associated with a particular topic, for example, home care job category. For example, the host platform may initiate a trigger with a particular topic and then read table data from that particular topic within the data store.

In 253, the host platform may execute various algorithms on the data read from the data store to create derived metrics. For example, the derived metrics may include information that is aggregated from a particular user over time, from many users over time, from a particular job/task over time, from many jobs/tasks over time, and the like. The metrics are created to provide facts to the user.

The metrics may be derived from data that is read from different records across different tables. Each record may have its own timestamp associated with it. For example, each table entry, document entry, blob entry, etc. may have a timestamp. In 254, the host platform may convert the timestamps from the plurality of data entries/records that are read by the host platform into an all-encompassing timing identifier that includes a value that represents the time of all of the plurality of entries. For example, six different records may be read in association with a query for the previous week. In this example, the timestamps may include year, date, and clock time format identifying when the data record is stored. The host platform may convert the timestamps into a single identifier that is more general than the timestamp. For example, the timing identifier may just be a month, a week, a year, etc. In 255, the host platform may write the derived data and the new timing identifier to the data store. In some embodiments, the host platform may create new data fields (e.g., representing the total count of records that have been read, etc.).

In 256, the host platform may generate insight from the derived metrics. In some embodiments, the insight may provide the user with context associated with the derived metrics. The context may give a user recommendations or suggestions on how to make more money and the derived metrics may include facts that support the recommendations. In 257, the insight may be added to a template and transmitted to a user via a notification such as email, SMS, etc.

FIG. 3A illustrates a topic mapping 300A used by a data store in accordance with an example embodiment. Referring to FIG. 3A, the data store may maintain topics within that include tables, partitions, documents, etc. that are assigned to each topic. Data that is ingested by the host platform may be stored within a particular topic based on a category of the data. Here, the host platform may determine a category for the data based on the content of the data, a source of the data, etc., and store the data within one or more tables, partitions, etc. that are assigned to that topic in the data store. In FIG. 3A, each topic 302 is mapped to a plurality of table identifiers 304. The mapping 300A may be stored within a dictionary, an index, a table, a document, etc. within the data store and may be accessed when a trigger is generated by the host platform.

In the example of FIG. 3A, the topics 302 are different types of job tasks that can be performed in a gig economy including, but not limited to, ride sharing, delivery driver, manual labor, home care, home rental, freelance, and the like. Each topic 302 can have data published thereto, and pulled therefrom. In this example, the data is stored in tables which are identified by table identifiers 304 in the topic mapping 300A.

FIG. 3B illustrates a process 300B of converting baseline data into derived data in accordance with an example embodiment. Referring to FIG. 3B, the host platform may read a plurality of data records 301 from four different tables (e.g., X45, X12, X13, and X32) that are associated with a particular topic (e.g., ride sharing). In this example, each of the records 301 includes a record identifier 302, a user name 304, a length of time 306, a data value (income earned) 308, and a timestamp 310.

According to various embodiments, the host platform may read the baseline data from a particular topic, and filter the data based on a particular search criteria. For example, the search criteria may be specified by the trigger. The search criteria may specify a particular day, a particular window of time, a particular geographic area, a particular user or group of users, a particular job category, etc. More than one search criteria may be applied. In the example of FIG. 3B, the data is filtered to identify income data from ride sharing tasks of all users within a particular city. Furthermore, the data is filtered to identify only income earned on Tuesdays in the immediately previous month.

The host platform may generate derived data that includes a new data record 311 having a record identifier 312. Here, the host platform may aggregate values from the data value field 308 of the plurality of records 301 of baseline data to generate a derived metric value 318 which includes an average of the values read from the data value fields 308 of the four records of baseline data. In addition, the host platform also creates a new field 314 including a total count of the records of the baseline data that are used to create the derived metric value stored in the field 318. The host platform also stores the length of time in the length of time field 316. The host platform also creates a new timing identifier and stores it within the timing field 320. Here, the new timing identifier is a more general representation of the timestamps and includes a time identifier that more broadly describes the timestamps. For example, rather than recite the specific times/dates of the data, the timing identifier may be a day of the week, a month of the year, a year, a quarter, a combination of these identifiers, and the like. For example, the timing identifier may be Tuesdays in October of 2020. The record 311 including the derived data may be stored within a new table or partition that is assigned to the topic. As another example, the record 311 may be stored in an already existing table or partition.

FIG. 4A illustrates a blank template 400A that may be used for notifications in accordance with an example embodiment, and FIG. 4B illustrates a filled-in template 400B in accordance with an example embodiment. Referring to FIG. 4A, the host platform may have a plurality of templates stored within a repository. Each template may include text content with blank spaces interspersed therein which are to be filled with derived data, user data, task data, and the like. The host platform may select the template 400A based on a type of insight to be created, which may be specified by the trigger. The template 400A may provide context to surround the derived metrics.

In the example of FIG. 4A, the host platform has selected the template 400A which includes a plurality of blank spaces 401-407 which are to be filled in with data values from underlying tables. The locations of the data items are shown on the right-hand side of the figure. The host platform may identify these locations at runtime based on the filtering and searching of the data store.

Referring to FIG. 4B, the host platform fills-in the template 400A with different data values to generate the filled-in template 400B. Each blank field 401-407 within the template 400A may receive a different data value. The host platform may identify a user associated with the trigger, contact information of the user, and transmit a notification including the filled-in template 400B to the user. Here, the notification may be transmitted via email, text message, and the like.

FIG. 5 illustrates a method 500 of sending notifications based on derived data in accordance with an example embodiment. For example, the method 500 may be performed by host platform including a computing device or a group of computing devices, such as a user device, a web server, a cloud platform, and the like. Referring to FIG. 5, in 510, the method may include receiving, via a message transmitted to a uniform resource locator (URL) of a host platform, information about a user of a software application. For example, the host platform may collect baseline data of users, financial entities, organizations, companies, etc., from external sources that are transmitted via webhooks to the URL of the host platform.

In 520, the method may include reading a plurality of records associated with the user from the received information, where the plurality of records include data and a plurality of timestamps, respectively. In 530, the method may include generating derived data based on the data included in the plurality of records. In 540, the method may include converting the plurality of timestamps into a single timing identifier that represents all of the plurality of timestamps. In 550, the method may include transmitting, to a computing system, a notification comprising the derived data and the new timing identifier.

In some embodiments, the reading may include reading the plurality of records from a first topic and writing the derived data and the new timing identifier to a second topic. In some embodiments, the plurality of records may include a plurality of database tables, and the reading may include executing structured query language (SQL) commands on the plurality of database tables. In some embodiments, the method may further include generating a new database table including the derived data and the timing identifier and storing the storing the new database table via one or more SQL commands. In some embodiments, the method may further include generating a new data field that is not included in the plurality of records which identifies a total count of the derived data, and storing the new data field within the new database table.

In some embodiments, the converting may include converting the plurality of timestamps comprising numerical data types into a text description comprising a string data type. In some embodiments, the method may further include storing the received information about the user within a stream of a topic associated with the user and the deriving comprises deriving the derived data from accumulated data of the user stored in the stream of the topic.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
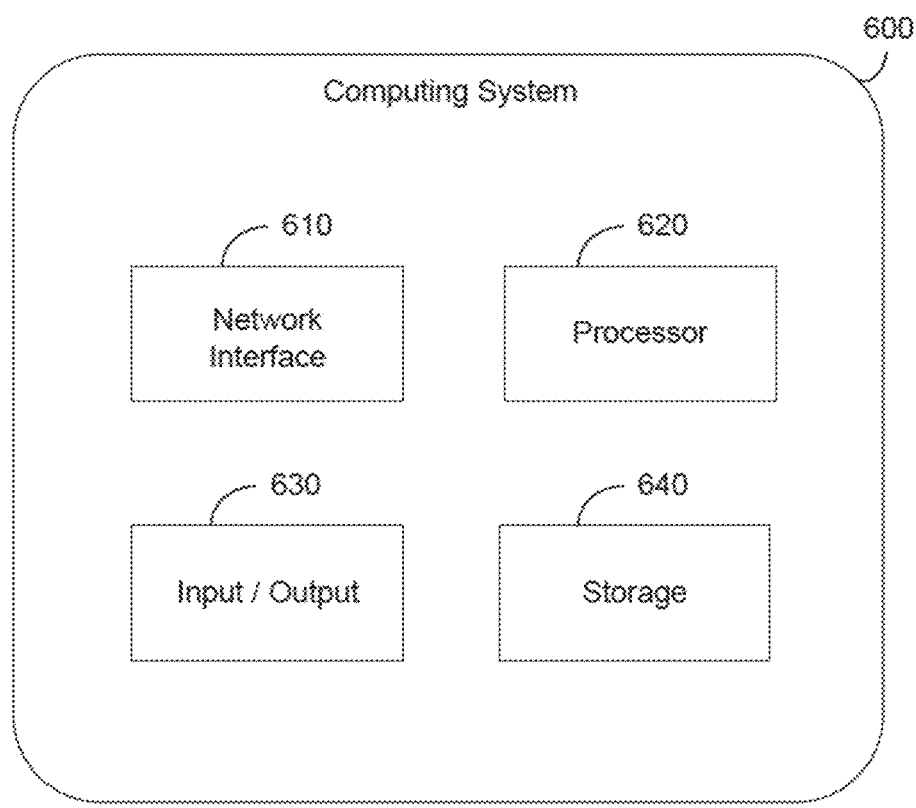
FIG. 6 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computing system 600 which may represent or be integrated in any of the above-described components, etc. FIG. 6 is not intended to suggest any limitation as to the scope of use or functionality of embodiments described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 400 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 400 may be a tokenization platform, server, CPU, or the like.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 6, the computing system 600 is shown in the form of a general-purpose computing device. The components of computing system 600 may include, but are not limited to, a network interface 610, one or more processors or processing units 620, an output 630 which may include a port, an interface, etc., or other hardware, for outputting a data signal to another device such as a display, a printer, etc., and a storage device 640 which may include a system memory, or the like. Although not shown, the computing system 600 may also include a system bus that couples various system components including system memory to the processor 620.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.: one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to:
receive, via a message transmitted to a uniform resource locator (URL) of a host platform, information about a user of a software application, the user being one of a community of users;
read a plurality of data records associated with the user from the received information, the plurality of data records comprising data and a plurality of timestamps, respectively,
generate baseline data of the user based on the data and the plurality of timestamps included in the plurality of data records, wherein the baseline data comprises an initial data value of an attribute of the user related to financial transaction data and employment data for the user;

create a new data record and store the baseline data of the user and a timing identifier of the plurality of timestamps in the new data record;

detect a change in the initial data value of the user based on a change to the initial data value to a changed data value within the data record;

in response to the detected change in the initial data value of the user to the changed data value, generate a new insight for the user based on execution of a machine learning model on the changed data value and the initial data value of the attribute of the user, the new insight including at least one of a combination of the changed data value and the initial data value of the attribute of the user related to the financial transaction data and employment data for the user and metrics derived therefrom; and a network interface configured to transmit, to a computing system associated with the user, a notification comprising the new insight generated by the machine learning model;

wherein the processor is further configured to detect a second trigger based on an amount of time between a current time and the timing identifier stored in the new data record, and in response, derive metrics based on the plurality of data records, and execute the machine learning model on the derived metrics to generate a second new insight for the user, the second new insight including metrics derived based on baseline data related to financial transaction data and employment data for other users within the community of users other than the user; and wherein the network interface is further configured to transmit the second new insight to the computing system associated with the user.

2. The computing system of claim 1, wherein the processor is configured to read the plurality of data records from a first table and write the new data record including the baseline data to a second table.

3. The computing system of claim 1, wherein the plurality of data records comprise a plurality of database tables, and the processor is configured to execute structured query language (SQL) commands on the plurality of database tables to read the plurality of database tables.

4. The computing system of claim 3, wherein the processor is further configured to generate a new database table that includes the baseline data and the timing identifier of the baseline data and store the new database table including the timing identifier in a database stream via one or more SQL commands.

5. The computing system of claim 4, wherein the processor is configured to generate a new data field that is not included in the plurality of data records which identifies a total count of the plurality of data records, and store the new data field within the new database table.

6. The computing system of claim 1, wherein the processor is further configured to convert the plurality of timestamps which are in numerical format into a word in string format, and store the word within the new data record.

7. The computing system of claim 1, wherein the processor is further configured to store the received information about the user within a stream of a topic associated with the user and derive additional data from accumulated data of the user stored in the stream of the topic.

8. A method comprising:

receiving, via a message transmitted to a uniform resource locator (URL) of a host platform, information about a user of a software application, the user being one of a community of users;

reading a plurality of data records associated with the user from the received information, the plurality of data records comprising data and a plurality of timestamps, respectively;

generating baseline data of the user based on the data and the plurality of timestamps included in the plurality of data records, wherein the baseline data comprises an initial data value for an attribute of the user related to financial transaction data and employment data for the user;

creating a new data record and storing the baseline data and a timing identifier of the plurality of timestamps in the new data record;

detecting a change in the initial data value of the attribute of the user based on a change to the initial data value to a changed data value within the data record;

in response to the detected change in the initial data value of the user to the changed data value, generate a new insight for the user based on execution of a machine learning model on the changed data value and the initial data value of the attribute of the user, the new insight including at least one of a combination of the changed data value and the initial data value of the attribute of the user related to the financial transaction data and employment data for the user and metrics derived therefrom;

transmitting, to a computing system associated with the user, a notification comprising the new insight generated by the machine learning model;

detecting a second trigger based on an amount of time between a current time and the timing identifier stored in the new data record, and in response, deriving metrics based on the plurality of data records, and executing the machine learning model on the derived metrics to generate a second new insight for the user, the second new insight including metrics derived based on baseline data related to financial transaction data and employment data for other users within the community of users other than the user; and transmitting the second new insight to the computing system associated with the user.

9. The method of claim 8, wherein the reading comprises reading the plurality of data records from a first table and writing the new data record including the baseline data to a second table.

10. The method of claim 8, wherein the plurality of data records comprise a plurality of database tables, and the reading comprises executing structured query language (SQL) commands on the plurality of database tables.

11. The method of claim 10, wherein the method further comprises generating a new database table including the baseline data and the timing identifier of the baseline data and storing the new database table including the timing identifier in a database stream via one or more SQL commands.

12. The method of claim 11, wherein the method further comprises generating a new data field that is not included in the plurality of data records which identifies a total count of the plurality of data records, and storing the new data field within the new database table.

13. The method of claim 8, wherein the method further comprises converting the plurality of timestamps which are in numerical format into a word in string format, and storing the word within the new data record.

14. The method of claim 8, wherein the method further comprises storing the received information about the user within a stream of a topic associated with the user and deriving additional data from accumulated data of the user stored in the stream of the topic.

15. A non-transitory computer-readable medium comprising instructions which when executed by a processor cause a computer to perform a method comprising:
receiving, via a message transmitted to a uniform resource locator (URL) of a host platform, information about a user of a software application, the user being one of a community of users;
reading a plurality of data records associated with the user from the received information, the plurality of data records comprising data and a plurality of timestamps, respectively;
generating baseline data of the user based on the data and the plurality of timestamps included in the plurality of data records, wherein the baseline data comprises an initial data value for an attribute of the user related to financial transaction data and employment data for the user;
creating a new data record and storing the baseline data and a timing identifier of the plurality of timestamps in the new data record;
detecting a change in the initial data value of the attribute of the user based on a change of the initial data value to a changed data value within the data record;
in response to the detected change in the initial data value to the changed user data value, generate a new insight for the user based on execution of a machine learning model on the changed data value and the initial data value of the attribute of the user, the new insight including at least one of a combination of the changed data value and the initial data value of the attribute of the user related to the financial transaction data and employment data for the user and metrics derived therefrom;
transmitting, to a computing system associated with the user, a notification comprising the new insight generated by the machine learning model;
detecting a second trigger based on an amount of time between a current time and the timing identifier stored in the new data record, and in response, deriving metrics based on the plurality of data records, and executing the machine learning model on the derived metrics to generate a second new insight for the user, the second new insight including metrics derived based on baseline data related to financial transaction data and employment data for other users within the community of users other than the user; and
transmitting the second new insight to the computing system associated with the user.

16. The non-transitory computer-readable medium of claim 15, wherein the reading comprises reading the plurality of data records from a first table and writing the new data record including the baseline data to a second table.

17. The non-transitory computer-readable medium of claim 15, wherein the plurality of data records comprise a plurality of database tables, and the reading comprises executing structured query language (SQL) commands on the plurality of database tables.

18. The non-transitory computer-readable medium of claim 17, wherein the method further comprises generating a new database table including the baseline data and the timing identifier of the baseline data and storing the new database table with the timing identifier via one or more SQL commands.

19. The non-transitory computer-readable medium of claim 15, wherein the method comprises converting the plurality of timestamps which are in numerical format into a word in string format, and storing the word within the new data record.

20. The non-transitory computer-readable medium of claim 15, wherein the method further comprises storing the received information about the user within a stream of a topic associated with the user and deriving additional data from accumulated data of the user stored in the stream of the topic.

* * * * *